UNITED STATES PATENT OFFICE 2,202,435

PROCESS FOR THE PRODUCTION OF VIRUS VACCINE FOR TREATMENT OF CANINE DISTEMPER

Hideo Mark Shoetensack, Shibuya-ku, Tokyo-shi, Japan

No Drawing. Application September 24, 1936, Serial No. 102,440. In Japan December 9, 1935

12 Claims. (Cl. 167—78)

This invention concerns a new method of preparing an effective and reliable virus vaccine for treatment of canine distemper with the pure culture of specific filtrable microorganisms obtained from pathological specimen of canine distemper, which nobody has hitherto succeeded in cultivating.

Comparison with the hitherto known methods:

The preparations hitherto in use for the purpose of prophylaxis of canine distemper have been prepared from pathological material obtained from, for example, the spleen or brain of infected test animals or diseased canines, but not from the culture of microorganisms. This accounts for the unreliability of the results obtained with other preparations.

By my invention, however, I have succeeded in obtaining a method of preparing a vaccine for prophylaxis and therapeutics of canine distemper with the pure culture of specific filtrable microorganisms Asterococcus canis, types I and II.

A description of the micro-organisms Asterococcus canis, types I and II, and of the methods whereby these may be isolated and pure cultures thereof produced is available in The Kitasato Archives of Experimental Medicine, volume XIII, No. 2, April 1936, pages 175-183, published in Tokyo, Japan.

This description is as follows:

Asterococcus canis, type I, N. Sp.

This is a filtrable microorganism which has been discovered by me and successfully cultivated by special methods from pathological material of canine distemper in 1932.

Many strains of this type have been isolated, each of which was obtained from different sources and by now the number of strains reached to over 25.

*Morphology.*—It is a pleomorphic, very minute, non-motile microorganism which passes through "Berkefeld N" or "Chamberland $L_2$ or $L_3$" filter candle. Thus it is a filtrable microorganism. The actual morphology of this microorganism is difficult to determine due to its too minute size and due to the reason that what one can observe under microscope might have to be considered as one or the other of involution forms of the microorganism. Many varieties of forms are found in the materials under various cultural conditions. The reason why I adopted this generic name Asterococcus for these organisms rests essentially on many important features, especially on the morphology and staining qualities which are almost identical in both organisms. It should be noted here that I do not consider the generic name Asterococcus exactly appropriate, for these filtrable microorganisms, but decided to apply it in preference to others proposed by different authorities, in view of the fact that, the mechanism of division or proliferation of this organism, like that of the virus of pleuropneumonia of cattle or the virus of agalactia, is still obscure, or at least uncertain, and also considering that, as pleomorphism prevails even in common bacteria in their course of involutions, the polymorphic nature of these filtrable organisms can not be so precisely taken into account for the purpose of classification.

*Visible morphology.*—Although these organisms are, as the others mentioned above, a very minute microorganism, and their actual form is difficult to investigate under the oil-immersion system, one is able to observe various pleomorphic elements in the majority of cases. These forms present variations in size and shape giving rise to polymorphism which is influenced by the age of the culture and by various conditions. The forms which may serve for identification of this group of virus in culture are: When observed under darkfield immersion system, the number and forms of visible elements differ greatly according to the material and in many instances, even in material containing numerous cells nothing particularly different from control material will be seen, only minute nodules being observed, though in some instances a considerable number of various characteristic forms can be found.

In stained preparations made from colonies on solid medium, there will be observed beside the coccoid or short rod shaped elements, various pleomorphic elements under oil-immersion system. They are filamentous, ring forms with or without swollen nodules or some with extending long or short poles, some showing spiral form, tripolar, branched or asteroid forms. These perhaps may have to be considered as a series of involutions, but as nothing except such forms are characteristic, they, I think, are very important for the identification of Asterococcus. In some instances, the more extraordinary gigantic involution forms which may be taken as the product of coalescence of mucoidal substance caused by autolysis of the organism are met with.

*Staining properties.*—The organism is difficult to stain by ordinary aniline dyes. It is Gram-negative, non-acid fast and non-motile for the absence of flagella. This organism is like the spirochete in the respect that it refuses to stain by ordinary aniline dyes such as methylene blue, but stains rather easily with Giemsa's solution or specific Victoria blue solution.

*Cultural features.*—This organism was initially cultivated by the method already described. 1. By direct cultivation of infected materials on "H" blood agar slant and incubating it at 37° C. and closing the top of the culture tube or under anaerobic conditions. In both cases the colonies of the organism appear after 3-5 days of incubation. 2. By cultivating the filtered "M. P." broth suspension of the infected lung or other materials on "M. P." blood agar directly or after keeping it in incubator for about 3-5 days. The colonies formed on these media are characterized by green discolorization or by fading of the colour of blood in the medium at the base. The colonies which appear are dew drop like, very minute and in many instances the colony formation takes place only after the second or the third generation on such media. This organism does not form colonies nor does it seem to grow on ordinary blood agar slant at the time of isolation from pathological materials, or even some times after several artificial culture generations. The cultured organism like the organism in infected organs or discharges is filtrable, i. e., it passes through "Berkefeld N" or "Chamberland L₂ or L₃" filter candles, through which none of even the smallest bacteria can pass.

(1) Oxygen requirement and optimum temperature: It is facultative aerobe, the growth takes place also anaerobically, the absolutely aerobic conditions being somewhat unsuitable. The optimum temperature for the growth is near 37°–38° C. No growth occurs at 23° C. or below. (2) The organism never grows nor proliferates in ordinary culture media such as normal agar, glucose agar, glycerin agar, normal gelatine, normal broth, milk, nitrate medium or potato slant. No growth likewise occurs in glucose agar stab culture. (3) It does not grow on ordinary blood agar slant nor on serum agar slant or stab at the time of isolation from pathological material and even after few culture generations. (4) and (5) It grows very slowly (taking 3–4 days to form colony) on special blood agar ("H" blood agar or "M. P." blood agar) when the medium is comparatively freshly prepared and the blood content in the medium is near ¼ the volume and when incubated at 37° C. preventing the drying of the surface of the medium, etc.

In preparing the basic agar media for "H" blood agar or "M. P." blood agar, the agar should not be too hard, when made into slant. So, in many instances (according to the viscosity of different samples of agar) the addition of it in proportion of 2% or even less is required for preparing a suitable medium. The sign of growth of the organism is best observed by pouring normal saline on the grown surface to cover the whole slant and observing through the saline, projecting a strong light to the surface of the slant and observing it in reflected light. (6) Colonies on "M. P." blood agar slant: The growth of the organism on this medium at 37° C. reaches its maximum after 4 or 5 days. The colonies when fully developed are moist, raised colonies with no visible structure, looking like dew drops. At their base the color of the blood is seen faded by the formation of methemoglobin, and when touched with platinum loop the colonies are easily destroyed.

They are of a very minute size in the early cultures but, after a few generations of sub-cultures on a suitable medium they begin to grow more luxuriantly and will get to form larger colonies, in most cases of 0.4–0.6 mm. in diameter after 4 days of incubation. (7) Growth on chocolate agar slant (ordinary blood agar slant heated at 65° C. for 15 to 20 minutes): On this medium the organism may grow slightly causing no color change of the medium, or will not grow at all. (8) Serum agar slant (made of inactivated horse serum added to normal clear agar medium of pH 7.0–7.2 in proportion of 10–12%): At 37° C. after 2 days of incubation + or −; after 3 days faint very moist colonies will be observed; after 4–5 days the growth will reach its maximum, but even after this time no clouding of the medium will be caused. (9) Stab culture in serum agar: A very slight growth takes place along the stab line after 3–5 days of incubation at 37° C. causing no clouding of the medium at the stab line. (10) Loeffler's coagulated serum (1% glucose broth 1: horse serum 3; heated at 80° C. 2 hrs. each day for 3 days): This organism does not grow on this medium. (11) Growth in blood broth (10% defibrinated horse blood in nutrient broth): In it a slight turbidity of the medium may be observed when growth of the organism takes place luxuriantly. (12) Action on carbohydrates: This organism when grown on 1% sugar serum agar, although considerable growth takes place, no acid will be formed from glucose, levulose, maltose, saccharose, mannitol, galactose nor inulin.

Sugars are sterilized separately in concentrated aqueous solution and then added in proportion of 1% after the serum has been added in proportion of 10% into sugar free agar melted and cooled to 50° C. and made into slant. For the indicator bromthymol blue and also litmus were both tried. These indicators were also added to the agar together with the sugars and serum.

*Viability.*—The transplantation of the organism when cultivated and kept at 37° C. must be done within the interval of 10 to 14 days and if delayed it often ceases to grow. But the cultured organism survives if kept in an ice chest for at least 30 to 40 days and sometimes more than 2 months.

*Thermal resistance.*—It is little resistant to heat. The organism in the condensed water of "M. P." blood agar is killed by 55° C. within 5 minutes, 50° C. in 10–20 minutes and at 48° C. in 30 minutes.

*Resistance towards disinfectants.*—(Organism in the condensed water of "M. P." blood agar 1 part, disinfectants in saline 1 part) 1% phenol will kill the organism in 8 minutes, at room temperature 0.5% in 10–20 minutes at 37° C. 0.1% will not kill the organism even after 2 hrs. at 37° C., 50% glycerine will kill the virus in 2–6 hrs. at 37° C. and 20% will not completely kill the organism even after 24 hrs. at 37° C.

*Asterococcus canis, Type II, N. Sp.*

This is a species of microorganism which I have discovered by means of successful cultivation by special methods from the nasal secretion of a dog suffering from respiratory type distemper in 1933. The relationship between this species and the Type I seems somewhat similar to that of strongly virulent pneumococci and weakly or non-pathogenic pneumococci, of which the former takes the place of the Type I organism and the latter of the Type II.

*Filtrability.*—This species of microorganism was never cultivated successfully from the "Berkefeld N" filtrate of the suspension of pathological material in suitable broth. But the pure culture may pass through "Berkefeld N" or "Chamberland L₂" filter candle. Thus it appears to be less filtrable than the Type I organism.

*Morphology.*—Morphologically it resembles much the Type I organism, but larger forms are frequently met with.

*Staining properties.*—Quite identical with those of the Type I.

*Cultural features.*—This organism was initially cultivated by inoculation of washed nasal secretion (purulent) on the surface of "H" blood agar and incubating it at 37° C. It grows more abundantly compared with the Type I on suitable agar media to which blood is added in proportion of 10–25% or serum in 10%, at the optimum pH of near 7.2–7.4. This organism, although it seems more easily cultivatable, will never grow on an ordinary blood agar slant at the time of isolation from pathological material. Its features though are very similar to those of *Asterococcus canis*, Type I, there are some points by which the two can be differentiated. They are the following points. (1) It grows more rapidly on "M. P." blood agar, ordinary blood agar, serum agar, and sugar serum agar. (2) On "M. P." blood agar, the color change of the blood in the medium into green color at the base of colony and a zone around it is remarkably clear and prominent. The fading of the color of blood at the base of grown film or colony is prominent also on ordinary blood agar, when it begins to grow well on it. (3) Sub-type: When grown on serum agar slant (10–12% horse serum in clear nutrient agar of pH 7.2) and incubated at 37° C. it will grow showing two different colony types, namely C type colony and L type colony. This type forms colonies similar in size to Type I, but, the colonies are characterized by the appearance of very beautiful cloudy halo around them, which usually appears after three to six days. (The clouding is much more prominent with the *Asterococcus mycoides* which will turn nearly the whole agar strongly cloudy.) (The organism characterized by this colony type will be called for convenience' sake "C" type colony.)

The other type is of those which I have met with among strains of the former ones during this winter by the same method of cultivation. This type colonies are much larger than those of the Type I organism on this medium, which is not so transparent and when observed in transmitted light looks turbid. The growth occurs after 2 to 3 days and the clouding of the medium is weaker than that of the "C" type or often nearly missing. (This colony type organism will be called "L" type colony in contrast to the former.)

*Some features which differ in some points from Type I.*—(1) Oxygen requirements and optimum temperature: It is facultative aerobe, the growth is better secured under anaerobic conditions than under absolutely aerobic conditions. The optimum temperature for the growth is near 37°–38° C. No growth occurs at 23° C. or below. (2) Growth on chocolate agar slant: the organism will grow moderately causing a slight or rather strong green discolorisation of the medium which is more prominent with the "L" type colony strains. (3) Stab culture in serum agar: growth takes place along the stab line after 2–4 days incubation at 37° C. The type "C" causing clouding of the medium around the line. The "L" type will grow more abundantly, but clouding is weaker or absent. (4) Growth in blood broth: a slight turbidity and weak hemolysis may be observed when growth of the organism takes place luxuriantly. (5) Action on carbohydrates: This organism when grown on 1% sugar serum agar, although the growth takes place considerably, no acid will be formed from glucose, levulose, maltose, saccharose, mannitol, galactose or inulin. Viability: The transplantation of the organism when cultivated and kept at 37° C. must be done within the interval of 14 to 16 days and if delayed it often ceases to grow. The cultured organism survives for about 30 days if kept in an ice chest. Thermal resistance: It is little resistant to heat. The organism will be killed by 55° C. within 5 minutes, 50° C. 10 minutes, or 48° C. 10–20 minutes. (The type "1" 20 minutes.) Resistance towards disinfectants: 1% phenol will kill the organism within 8 minutes at room temperature, 0.5% in 10 minutes 37° C.; glycerine 50% will kill the virus in 4 hrs. at 37° C. and 20% will not completely kill the organism even after 24 hrs. at 37° C.

The "H" blood agar mentioned above is prepared as follows:

The preparation of "H" blood agar

| | |
|---|---|
| Chopped fillet beef_____grams__ | 500 |
| Water_____ | |
| Peptone (Witte's)_____grams__ | 10 |
| Sodium citrate_____do____ | 5 |
| Whole egg_____ | 1 |
| Agar_____grams__ | 25 |

Take away the fat from fillet beef, chop it to finger size, soak it in 1200 cc. of water and squeeze the meat well, then neutralize the reaction by normal NaOH solution to neutral. Leave it standing for 20 minutes, then filter through filter paper squeezing the meat in a cotton bag.

To this filtrate add 25 gm. of thread agar which has been previously soaked and rinsed well in water and a whole egg. Heat this mixture gradually by constant stirring and let the agar dissolve completely, filter it through a boiled cloth and to this add 10 gm. of Witte's peptone and 5 gm. of sodium citrate, make up the volume to one liter and adjust the reaction to pH 7.2. Tube and sterilize by fractional sterilization.

"H" blood agar is prepared by adding ca. ⅓ the volume of sterile horse or rabbit blood (defibrinated) to this medium melted and cooled to 45–48° C. and made into slant.

The "M. P." broth above mentioned is prepared as follows:

The preparation of "M. P." broth (meat pepton broth)

| | |
|---|---|
| Fillet beef chopped to finger size____grams__ | 500 |
| 1% concentrated hydrochloric acid in water_____cc__ | 1000 |
| Pepsine Goto's pure pepsine)_____grams__ | 1 |

Heat this mixture for 4 hrs. at 50° C. shaking the content from time to time, then raise the temperature of water bath to 70° C. and heat in the same manner for one hour. After this, heat at 80° C. for 10 minutes and then neutralize the acid with 35% NaOH solution (ca. 10–12 cc. will be sufficient) at ca. 70° C. When it is quite neutralized, it is then filtered through a layer of cotton boil cloth. The reaction is again corrected and put at pH 7.2–7.4. Let it cool down and filter through filter paper and a slightly yellowish transparent fluid is obtained. Tube and sterilize fractionally 30 minutes each for 3 days in running steam sterilizer.

The Biuret test was made to see the degree of digestion and it was proved that this solution gave 4 to 6 times as strong reaction compared with a normal broth.

The "Victoria blue" staining solution mentioned above has the following formula.

*Formulae of Victoria blue staining solution
(keeps for half a year)*

|  | | Cubic centimeters |
|---|---|---|
| Sol. No. 1 | Liquid potassium acetate | 20 |
|  | Glacial acetic acid | 5 |
|  | Made up with distilled water to | 600 |

The pH will come to 4.8–5.0.

Sol. No. 2: 1.5% solution of Victoria blue, 4R; G. Grubler in distilled water. Mix 30 cc. of Sol. No. 1 with 10 cc. of Sol. No. 2.

According to the present invention, the vaccine for use in the prophylaxis and therapeutics of canine distemper is prepared from the specific micro-organisms Asterococcus canis, types I and II, by isolating the said micro-organisms and preparing a pure culture thereof in vitro so as to produce a sufficiently antigenic preparation and adding thereto a reagent adapted to kill the micro-organisms but not to affect the antigenicity of the preparation. For this purpose the micro-organisms are, in the first place, isolated from distemper infected tissue or exudate and cultivated and proliferated on blood-agar slant prepared with pepsine-digested meat broth. To this solid medium, is then added in sterile manner, a mixture of blood-digested broth, meat-digested broth and some quantity of a solution of cystine in alkaline aqueous glycerine, obtained by dissolving cystine in 20% aqueous solution of glycerine, to which is added 1/10 its volume of 10% aqueous potassium hydroxide. In this medium the microorganism is allowed to proliferate sufficiently to make possible the preparation therefrom of efficiently prophylactic and therapeutic vaccine. The said vaccine is prepared by adding to this fluid certain special chemical preservatives, to an extent that does not affect the antigenicity of the vaccine, for the purpose of killing the microorganisms and preserving the vaccine in a suitable condition for its purpose.

In order that the nature of my invention may be clearly understood, a practical example thereof may be described as follows:

By suspending the distemper infected tissue or exudate, obtained from distemper infected canines or other susceptible mammals in a specific broth, prepared from meat and blood digested separately with pepsine, and allowing the virus to be freed out in this medium, and filtering it through "Chamberland L$_2$" candle or "Berkefeld N" filter candle, a bacteria-free but virus-containing fluid is obtained. This is kept in an incubator at a temperature of 37° C.–38° C, for 3 days to let the said filtrable microorganism proliferate in it.

From this virus-containing material, as specified above, a pure cultivation is procured by inoculating it on specific blood-agar slant prepared from meat-digested broth and incubating same for from three to four days. From the first to the third generation of transplantation on such medium, minute dew-drop-like colonies are found developed, at the bases of which the colour of the medium turns greenish, or to a slightly faded colour. By making a microscopic preparation from these colonies and by examining it under oil immersion system, very minute microorganisms, different from bacteria, which resemble Asterococcus mycoides (the causative organism of peripneumonia of cattle) can be observed. These are the filter-passers in question (i. e. Asterococcus canis) of which there are two types, I and II.

It should be noted that the artificial and in vitro cultivation of these microorganisms is now only obtainable by using the method as described hereabove.

The pure culture of Asterococcus canis, types I and II, thus isolated, is transplanted onto 15 c. c. blood-agar slant and incubated at a temperature of 37°–38° C. for three days. Then, onto this is poured, in sterile manner, 10 c. c. of a mixture of blood-digested broth, meat-digested broth and 1 c. c. of a solution of cystine in alkaline aqueous glycerine, obtained by dissolving cystine in 20% aqueous solution of glycerine, to which is added one-tenth of its volume of 10% aqueous potassium hydroxide solution. This is incubated for a period of from three to four days at a temperature of 37°–38° C. By this time the fluid becomes opalescent through the proliferation of the microorganisms.

This fluid is then collected in a bacteriologically sterile manner. The remaining virus on the agar slant is collected with 10 c. c. of physiological salt solution, and the latter, added to the former, is filtered through sterile filter paper. To this filtrate special preservative chemicals, say phenol 0.25%, Brilliant green 0.005%, are added to an extent that does not affect its antigenicity, but kills the microbe.

The vaccine thus obtained is to be tested firstly for its therapeutic and prophylactic qualities.

Examples of methods for the practical application of this preparation:

For prophylactic purposes 2 c. c. of this vaccine is injected subcutaneously in the shoulder of a canine. After 3 to 4 days another injection is given of the same dose and in like manner. This treatment ensures the immunity of the animal against distemper lasting up to six months.

For therapeutic purposes the vaccine is also injected subcutaneously in the shoulder of an infected canine, adjusting the dosage to from 2 c. c. to 4 c. c., at intervals of not less than 24 hours.

In all cases, injected as above, the vaccine has been proved to be quite harmless to canines.

It is well known that distemper is also common to many other animals of the mammal group, such as badgers, foxes, ferrets, etc., and therefore the causative micro-organisms can also be isolated and cultivated from the infected tissues or exudates from these latter animals.

Having now particularly described and ascertained the nature of my said invention, and in what manner the same is to be performed, I claim:

1. A process for the preparation of canine distemper vaccine which comprises isolating and preparing a pure culture of the filtrable microorganisms Asterococcus canis, types I and II from a distemper infected source, inoculating a solid blood agar nutrient medium therewith, incubating said culture upon said solid medium, then adding a mixture of blood-digested broth, meat digested broth and an alkaline solution of cystine in glycerine to said mass, further incubating said organisms therein, then separating said liquid and solid media, filtering the liquid medium and adding to the filtrate a phenol-Brilliant green solution of a strength sufficient to kill the micro-organisms and to preserve the filtrate while maintaining its antigenicity.

2. A process for the preparation of canine distemper vaccine which comprises isolation of a pure culture of *Asterococcus canis*, types I and II, inoculating a blood agar slant medium therewith and incubating the same until the growth of said organism takes place sufficiently, then pouring a blood and meat-digested broth containing an alkaline aqueous glycerine solution of cystine upon the surface of the slant medium, and incubating until the fluid becomes opalescent, removing and filtering the said fluid culture, then adding to this filtrate 0.25% phenol and 0.005% Brilliant green, in amount sufficient to kill the micro-organisms and to preserve the filtrate while maintaining the antigenic power of the preparation.

3. The process of claim 2, as modified in that the chemical preservative consists of phenol 0.25% and Brilliant green 0.005%.

4. The process of claim 2, as modified in that the agar slant is a blood agar slant containing meat-digested broth.

5. The process of claim 2 as modified in that the *Asterococcus canis* micro-organisms may be cultured through a plurality of generations before undertaking the second part of the process which consists in obtaining fluid culture as specified.

6. The process of claim 2, as modified in that the incubation temperature is 37 to 38° C.

7. A canine distemper vaccine, which comprises dead cultured *Asterococcus canis* organisms and a solution of phenol and Brilliant green.

8. A canine distemper vaccine which comprises dead *Asterococcus canis* organisms, their active antigen and suitable chemical preservatives.

9. A canine distemper vaccine which comprises dead cultured *Asterococcus canis* organisms and their active antigenic properties.

10. The process of claim 2 as modified in that the alkaline aqueous glycerine solution is prepared by dissolving cystine in 20% aqueous solution of glycerine, to which is added one-tenth its volume of 10% aqueous potassium hydroxide.

11. The process of claim 2 as modified in that the liquid medium is prepared from blood-digested broth, meat digested broth, and an alkaline aqueous glycerine solution of cystine, mixed in a proportion of ten units of blood and meat-digested broth to one unit of the solution of cystine.

12. The process of claim 2 as modified in that, after removing the fluid culture from the solid medium slant, the remaining virus on said solid medium is collected with a physiological salt solution and that the liquid thus obtained, mixed with the fluid culture, is filtered to obtain the filtrate from which, mixed with chemical preservatives, the vaccine is made.

HIDEO MARK SHOETENSACK.